United States Patent [19]

Kemp, Jr.

[11] 4,217,980

[45] Aug. 19, 1980

[54] SEALED HANGER BEARING FOR AUGER CONVEYOR

[76] Inventor: Dennis E. Kemp, Jr., P.O. Box 167, South Orange, N.J. 07079

[21] Appl. No.: 964,879

[22] Filed: Nov. 30, 1978

[51] Int. Cl.$^2$ ............................................. B65G 33/32
[52] U.S. Cl. ..................................... 198/666; 198/672; 308/36.1
[58] Field of Search ....................... 198/666, 672, 673; 308/36.1, 36.2, 36.4, 36.5

[56] References Cited

U.S. PATENT DOCUMENTS

| | | | |
|---|---|---|---|
| 1,729,211 | 9/1929 | Erisman | 198/666 X |
| 2,524,948 | 10/1950 | Whitney | 198/672 |
| 2,980,407 | 4/1961 | Luscombe | 308/36.4 X |
| 3,189,168 | 6/1965 | Coats et al. | 198/672 X |

FOREIGN PATENT DOCUMENTS 278860  10/1927  United Kingdom ................... 308/36.4

*Primary Examiner*—Jeffrey V. Nase
*Attorney, Agent, or Firm*—Mark T. Basseches; Paula T. Basseches

[57] ABSTRACT

This invention relates to an improved hanger bearing construction for auger conveyors and is directed more particularly to a sealed hanger bearing having improved service life. The device is characterized by the provision of frictionally driven wiper means which rotate with the shaft and prevent the ingress of contaminants into the interior of the bearing structure with consequent premature compromise of the bearing.

11 Claims, 5 Drawing Figures

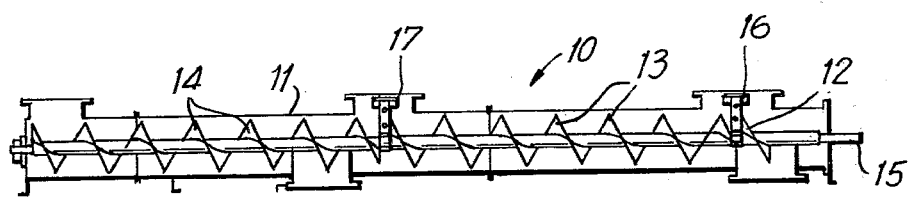
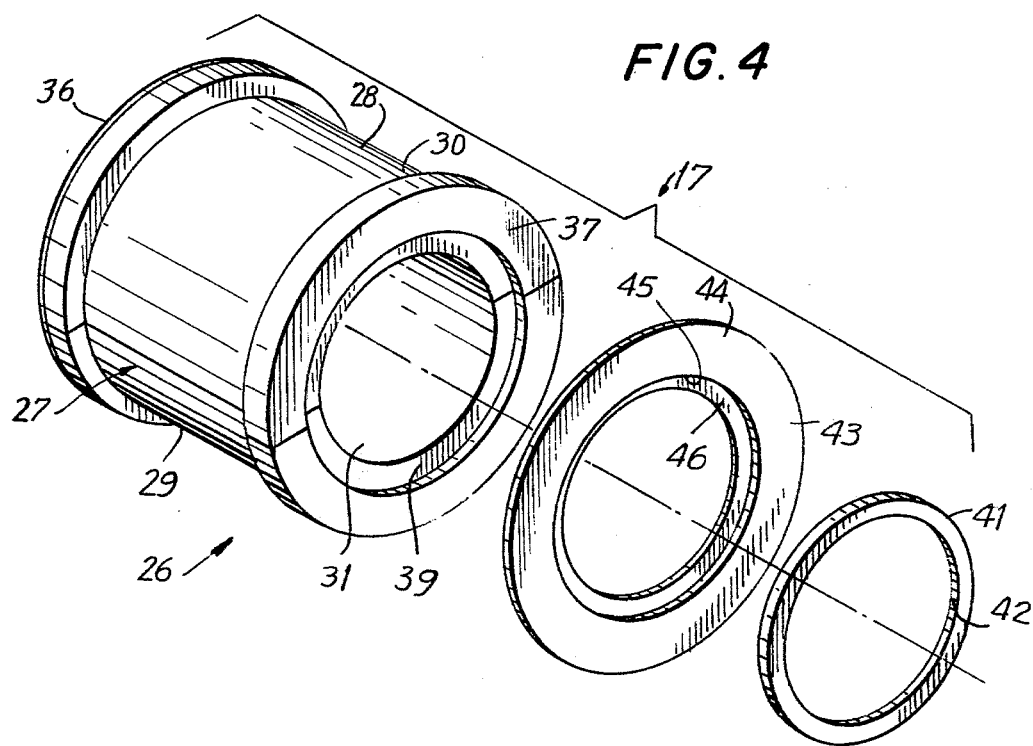

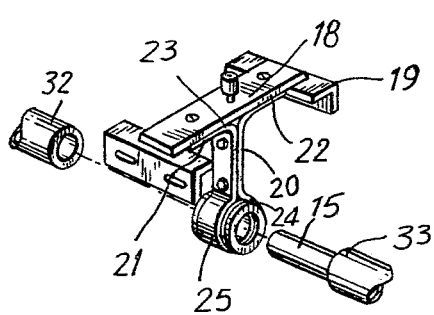
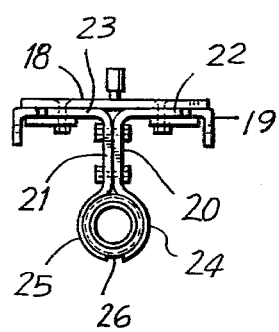
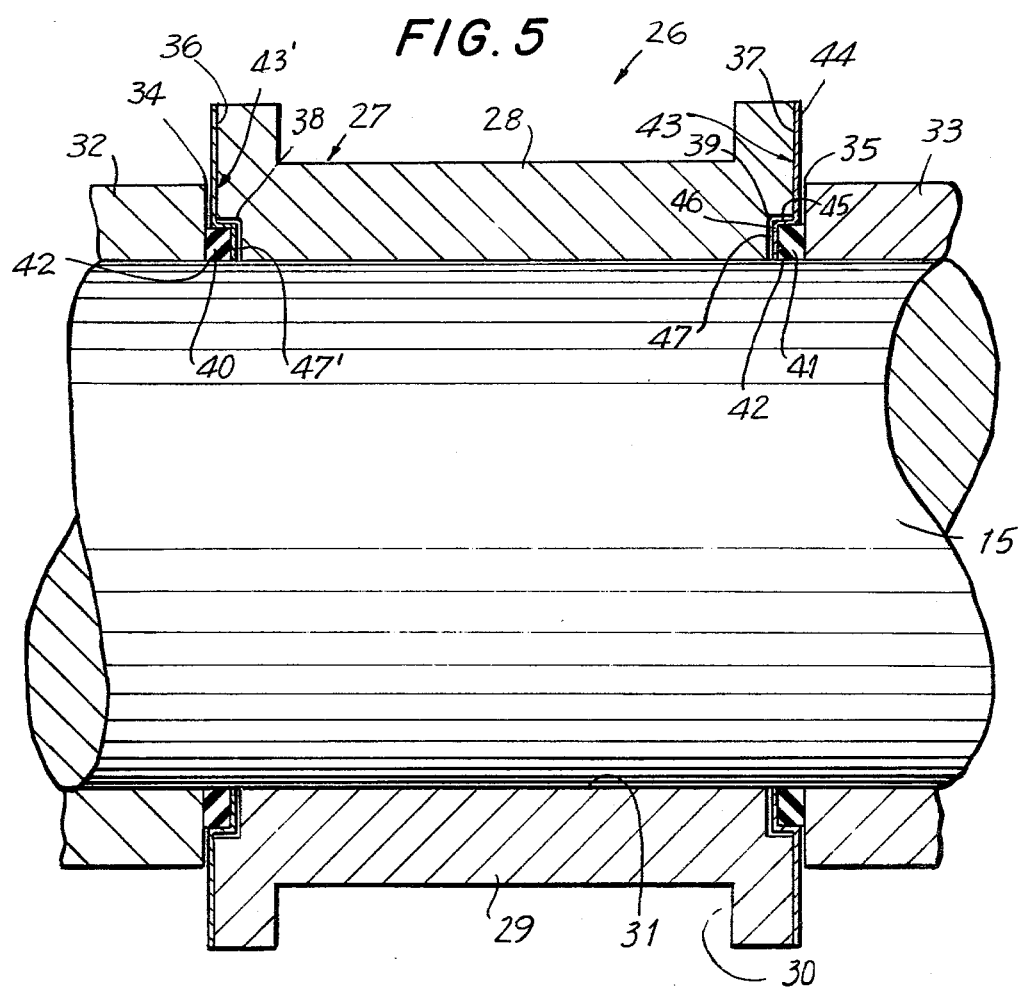

4,217,980

SEALED HANGER BEARING FOR AUGER CONVEYOR

BACKGROUND OF THE INVENTION

1. Field of the Invention

The present invention is in the field of auger conveyors and pertains more particularly to an improved hanger bearing for interposition between adjacent auger sections of a conveyor.

2. The Prior Art

In the typical screw or auger conveyor arrangement which incorporates a series of auger sections mounted on a common drive shaft, it is necessary to support the drive shaft at intervals between the auger sections in order to prevent deflection of the drive shaft. To this end, the auger sections are axially separated along the drive shaft by predetermined amounts and bearings supported from hangers surround the drive shaft at said intervals.

In a typical arrangement, the hanger may comprise a fixture depending from a support. The bearing component may comprise a pair of half sections which together define a cylindrical bore. The half sections are made of anti-friction material, such as wood, plastic, graphited bronze or the like, the sections being held together by the hanger assembly with the shaft supported in the bore.

Since the principal weight carrying function of the bearing assembly is performed by the lowermost section thereof, it will be readily recognized that within a relatively short period of time, the bore may become worn from its initial cylindrical configuration, resulting in increase in clearance space between the drive shaft and the upper surfaces of the bearing. Progressively material which is moved by the conveyor will enter into the clearance space, contaminating the bearing surfaces and causing premature wear of the bearing. As a result, hanger bearings for screw conveyors must frequently be changed, especially where the material which is fed is somewhat abrasive.

Attempts have been made through the use of packings and like expedients interposed between relatively moving parts to isolate the bearing interior against the ingress of pulverulent material. However, such attempts have proven for the most part to be commercially unsuccessful, requiring frequent adjustment, and have, in addition, introduced the possibility of contaminating the contents of the conveyor.

SUMMARY OF THE INVENTION

The present invention may be summarized as directed to an improved hanger bearing for use in auger type conveyors between adjacent auger sections. The bearing sections, as is conventional, employ a bearing housing comprised of two blocks of anti-friction material which, when assembled, define a bore sized rotatably to support the drive shaft. The bearing housing is undercut at its end portions in the area surrounding the bore. A pair of washer members are mounted adjacent the ends of the housing surrounding the shaft, the washer members including a wiper portion disposed adjacent the ends of the bearing housing and drive portions extending into the recesses at the ends of the housing. The washer is made of a material, such as smooth stainless steel, having a low coefficient of friction.

A pair of elastomeric, high friction drive glands are mounted over the drive shaft in intimate engagement therewith, the glands being disposed within the recesses in contact with the drive portions of the washers. Contact between the glands and the washers is maintained by the ends of the tubular cores supporting the auger sections, which ends are biased against the side edges of the glands remote from the washers.

In the noted arrangement, when the drive shaft rotates, a concomitant rotation is imparted to the glands, and through the glands to the washers.

The rotating wiper sections of the washers are biased yieldingly against the side edges of the housing, whereby the ingress of pulverulent material to the interior of the bearing is prevented, resulting in a hanger bearing construction having a useful life many times that of conventional hanger bearings.

It is accordingly an object of the invention to provide a hanger bearing for supporting the drive shaft of an auger type conveyor.

It is a further object of the invention to provide a device of the type described which embodies means for positively precluding ingress of materials processed by the conveyor, whereby the useful life of the bearing is substantially extended.

Still a further object of the invention is the provision of a hanger bearing for an auger type conveyor which includes frictionally driven wiper washers.

Still a further object of the invention is the provision of a hanger bearing of the type described adapted to be utilized in replacement of hanger bearings heretofore known, and a conveyor assembly embodying the same.

To attain these objects and such further objects as may appear herein or be hereinafter pointed out, reference is made to the accompanying drawing forming a part hereof, in which:

FIG. 1 is a vertical sectional view diagrammatically showing an auger assembly;

FIG. 2 is a perspective view of a bearing device mounted in a hanger in accordance with the invention;

FIG. 3 is an end elevational view of the hanger of FIG. 2;

FIG. 4 is an exploded perspective view on a magnified scale of components of the bearing assembly;

FIG. 5 is a magnified sectional view through the bearing assembly.

Referring now to the drawings, there is shown in FIG. 1 a diagrammatic display of an auger assembly 10 disposed in a tubular housing 11, the assembly including three auger sections 12, 13 and 14. The housing 10 includes a drive shaft 15 to which the auger sections are keyed for rotation.

In order that the drive shaft 15 not bow or deflect under the weight of the auger sections and the material fed, the drive shaft is supported by hanger bearing assembles 16, 17 at the interface between auger sections 12 and 13, and 13 and 14, respectively. The hanger bearing assemblies 16, 17 are identical, and a description of one such construction will suffice.

In FIG. 2 there is disclosed in greater detail a hanger bearing device which includes a support bracket assembly 18 mounted to a framework or housing 19 above the conveyor. The bracket 18, as is conventional, is comprised of two half sections 20, 21 having upper leg portions 22, 23, respectively, bolted to the bracket 18 and to each other.

The half sections 20, 21 include arcuate bearing carrier arms 24, 25 which together define a particylindrical retainer for the generally cylindrical bearing member

26.

The bearing, as best seen in the exploded perspective view FIG. 4, is comprised of a two part housing 27, including an upper half 28 and a lower half 29 made of material having a low coefficient of friction, e. g. high density polyethylene, graphited bronze, etc. The two sections, when assembled, define an essentially cylindrical spool-like configuration having an annular recessed track 30 formed on its outer peripheral portion for receiving the arms 24, 25 of the hanger. Additionally, the bearing includes an interior bore 31 sized to fit with minimal clearances about the drive shaft 15.

As will be apparent from an inspection of FIG. 5, the bearing assembly 27 is mounted between the tubular cores 32, 33 of adjacent auger sections, e.g. sections 13 and 14, the flutes of the auger being fixed to the cores as by welding.

Referring again to FIG. 5, it will be seen that the distal ends 34, 35 of the tubular cores 32, 33 respectively are disposed in proximate spaced relation to the end portions 36, 37 of the bearing housing.

The ends 36, 37 of the bearing housing are provided with annular recesses 38, 39, respectively, surrounding the drive shaft. A resilient elastomeric (e.g. 35 durometer latex) drive gland 40 is mounted in the recess 38 in the end 36 of the housing. In similar fashion, a like gland 41 is mounted in the recess 39 in the end 37 of the housing. Each of the glands has a central aperture 42 sized intimately to seat over the drive shaft 15, thus defining a tight seal and a frictional drive connection with the shaft.

An offset washer 43 is interposed between the end 37 of the housing and the adjacent end 35 of the core. The washer 43 includes a radially outwardly extending wiper portion 44 which lightly brushes against the end 37 of the housing, an intermediate or transition portion 45 which lies within recess 39, and a radially inwardly directed drive portion 46 disposed within the recess.

The clearances between the components are such that the elastomeric gland 41 is lightly compressed between the end 35 of the core and the drive portion 46 of the washer. An identical washer assembly 43' is interposed between the end 34 of the core 32 and the end 36 of the housing 27 in frictional driving engagement with gland 40.

The operation of the device will be readily understood from the preceding description.

When the shaft 15 is driven, it carries with it the elastomeric glands 40, 41 which are tightly seated over the shaft. The glands, in turn, by virtue of their contact with washers 43, 43' drive the washers in a rotary direction.

It will be appreciated that the high coefficient of friction of the glands to the steel washers, e.g. in the area of about 0.7, will provide sufficient friction to cause the rotary movement of the stainless steel washers. Since the coefficient of friction of the glands to the washers is far greater than the coefficient of friction between the wiper portions of the stainless stell washers and the bearing housing ends (about 0.08 to about 0.15), relative rotation will take place between the washers and the housings rather than between the washers and the drive shaft.

By virtue of the rotated wiping action of the washers against the end portions 36, 37 of the housing, ingress of pulverulent material to the interior of the bearing at the interface between the washer and the housing is substantially completely prevented.

Likewise, access of pulverulent materials to the interior of the bearing is prevented by the seating of the glands 40, 41 about the shaft 15 and by the contact of the side edges of the glands against the ends of the cores.

A clearance space is defined between the outwardly facing walls 47, 47' of the ends of the housing within the recess and the drive portions of the washers, clearance being likewise provided between the transition portion 45 of the washers and the radially inwardly facing walls of the housing defining the recess.

A hanger bearing in accordance with the present invention, by reason of its exclusion of material from the interior surfaces embracing the drive shaft 15, provides a substantially longer life than hanger bearings heretofore known. Should it ever be necessary to replace the housing portion of the bearings, the half sections 20, 21 are unbolted, allowing the worn housing halves to be removed and a substitute pair of housing halves to be interposed between the washers 43, 43'.

As an indication of the efficiency of the hanger bearing device, in a particular installation there has been experienced a 20 decibel reduction in noise as a result of the use of the disclosed bearing. Since noise in a system of the type described is an indication of bearing wear, it will be appreciated that the reduction in noise, in addition to being a desideratum in and of itself, is an indication of the expected longer life characteristics of the hanger bearing.

From the above description it will be evident to skilled workers that numerous variations may be made in the described embodiment without departing from the spirit of the present invention. By way of example, whereas the glands 40, 41 are depicted as incorporating planar opposed side surfaces, it will be recognized that the glands may be shaped with or incorporate annular, laterally directed projections which are adapted to be pressed or deformed when the bearing halves are positioned, to provide better driving connection with the washers.

Accordingly, the invention is to be broadly construed within the scope of the appended claims.

Having thus described the invention and illustrated its use, what is claimed as new and is desired to be secured by Letters Patent is:

1. In a conveyor construction including a drive shaft, first and second auger sections mounted in axially spaced relation on said shaft, said sections including cylindrical core portions keyed to said shaft, the opposed ends of said core portions being disposed in predetermined spaced relation, the improvement which comprises a sealed hanger bearing assembly interposed between said sections in rotary sliding engagement with said shaft, said bearing assembly including a central, generally cylindrical housing of low friction bearing material, said housing having a bore surrounding said shaft, hanger means fixed to and supporting said housing, first and second end portions on said housing disposed in proximate spaced opposed relation respectively to said opposed ends of said core portions, said housing end portions including an annular recess surrounding said shaft, a wear-resistant, anti-friction washer member interposed between said ends of said core portions and said first and second ends of said housing, said washers each including a radially directed wiper portion intimately engaging the opposed ends of said housing outwardly of said recess, and a drive portion extending toward said shaft, said drive portions being disposed within said recesses, and a resilient, compressible, high friction drive gland disposed in each said recess in engagement with said shaft, said drive portions of said washers, and said ends of said cores, said glands yieldably biasing said wiper portions against said ends of said housing and forming a frictional drive connection between said shaft and said washers.

2. Apparatus in accordance with claim 1 wherein said housing is comprised of two half sections.

3. Apparatus in accordance with claim 2 wherein said drive glands are elastomeric and frictionally engage said drive shaft.

4. Apparatus in accordance with claim 3 wherein said washers include a generally axially directed transition portion interposed between said wiper and said drive portions.

5. Apparatus in accordance with claim 4 wherein said drive portions of said washers are spaced axially outwardly of said ends of said recess.

6. A hanger bearing for rotatably receiving a drive shaft interposed between adjacent conveyor sections comprising a housing member formed of anti-friction material, said member including a central bore adapted to receive and rotatably support said shaft, said housing including radially directed end portions, an annular recess formed in each said end portions surrounding said bore, a wear-resistant, anti-friction washer disposed adjacent each end of said housing, said washers each including a drive portion disposed within said recess and a wiper portion slidably engaging a said end of said housing, and a resilient, compressible high friction drive gland disposed within each said recess in engagement with the outer faces of said drive portions of said washers to define a seal area therebetween, said glands including central apertures adapted to surround and frictionally engage and form a seal with said drive shaft.

7. Apparatus in accordance with claim 6 wherein said housing is comprised of two half sections.

8. Apparatus in accordance with claim 7 wherein said drive glands are elastomeric and frictionally engage said drive shaft.

9. Apparatus in accordance with claim 8 wherein said washers include a generally axially directed transition portion interposed between said wiper and said drive portions.

10. Apparatus in accordance with claim 9 wherein said drive portions of said washers are spaced axially outwardly of said ends of said recess.

11. In a conveyor construction including a drive shaft, first and second auger sections mounted in axially spaced relation along said shaft, said sections including cylindrical core portions keyed to said shaft, the opposed ends of said core portions being disposed in predetermined spaced relationship, the improvement which comprises a sealed hanger bearing assembly interposed between said sections in rotary sliding engagement with said shaft, said bearing assembly including a central, generally cylindrical housing of low friction bearing material, said housing being formed of two semi-cylindrical half sections together defining a bore surrounding said shaft, hanger means fixed to said halves of said housing and supporting the same in encircling relation of said shaft, first and second end portions on said housing disposed in proximate spaced opposed relation respectively to said opposed ends of said core portions, a wear-resistant anti-friction washer member interposed in the space between the ends of said core portions and said ends of said housing, and a resilient, compressible, high friction elastomeric drive gland nonrotatably mounted on said shaft between each of said ends of said core portions and a said washer, said glands being compressed between said ends and said washers and defining a seal with said washers and with said shaft, said glands yieldably biasing said washers against said ends of said housing and forming a frictional drive connection between said washers and said shaft.

* * * * *